(No Model.)
A. M. RANDOLPH.
JOURNAL BEARING AND METALLIC COMPOUND THEREFOR.
No. 320,445. Patented June 16, 1885.
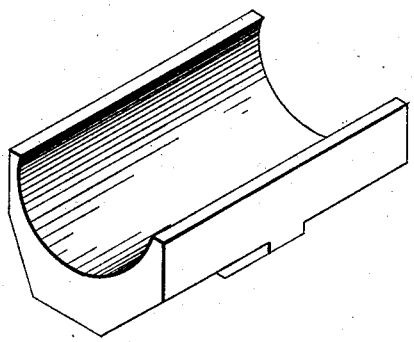
Witnesses
A. S. Paré
Chas. J. Baur
Inventor
Arthelo M. Randolph
by Munday, Evarts and Adcock
his Attorneys

UNITED STATES PATENT OFFICE.

ARTHELOW M. RANDOLPH, OF BRAINERD, MINNESOTA, ASSIGNOR TO HIMSELF, JAMES G. BUTTERFIELD, AND J. S. WHEELER, BOTH OF SIOUX CITY, IOWA.

JOURNAL-BEARING AND METALLIC COMPOUND THEREFOR.

SPECIFICATION forming part of Letters Patent No. 320,445, dated June 16, 1885.

Application filed April 2, 1885. (No model.)

*To all whom it may concern:*

Be it known that I, ARTHELOW M. RANDOLPH, a citizen of the United States, residing in Brainerd, in the county of Crow Wing and State of Minnesota, have invented a new and useful Improvement in Journal-Bearings and Metallic Compounds Therefor, of which the following is a specification.

Heretofore the journal bearings for cars and locomotives have usually been made of brass. While the brass bearings possess the requisite strength, and in other respects give better satisfaction perhaps on the whole than any other metal or metallic compound heretofore discovered, still great inconvenience is found in their practical use, owing to the fact that the brass bearing becomes brittle and crumbles at a red heat, so as to rapidly cut and spoil the journal whenever the box or bearing happens to become hot, as sometimes unavoidably occurs; and the brass bearing is not very durable, though it is quite expensive.

Journal-bearings for various uses have also heretofore been made of an outer skeleton of iron, or other strong metal, filled in with some anti-friction metallic alloy—like Babbitt metal, for example—to form the bearing surface for the journal, which outside skeleton or case gives the requisite strength to the bearing. My invention, however, does not relate to such skeleton bearings, nor to a metallic compound for filling, its object being to provide a bearing of one homogeneous material that may be cast in one solid piece, like the ordinary brass bearing, which will be adapted for like uses and purposes, and which will at the same time obviate the defects and objections of the brass bearing before mentioned.

The special object of my invention is to provide a cheap, strong, durable, and practical bearing for car and locomotive journals; and to this end I have discovered that by making the journal-bearing of a metallic compound composed of sixty pounds of lead, forty-five pounds of tin, fifteen pounds of antimony, twelve pounds of zinc, and about one ounce of phosphorus the bearing will not only have the requisite strength when cast in one solid piece, like a brass bearing, but it will be much more durable, and if the bearing happens to get hot enough to burn off all the lubricant it will still not cut or wear the journal, as a brass bearing will do under like circumstances.

My improved bearing, while it is superior in every respect to the brass bearing, can also be produced at a much less cost than the latter, as the price of brass is ordinarily from eighteen to twenty-five cents per pound, while my new metallic compound can be produced for about eleven cents per pound.

The distinguishing characteristics or qualities of my new metallic compound are, first, that at a red heat it will draw under the hammer like wrought-iron—that is to say, it is malleable; second, it possesses greater strength than brass to resist fracture; third, it is tougher than brass; fourth, it does not become brittle or crumble at a red heat like brass; fifth, it produces less friction than brass, and is more durable as a bearing, and has less liability to heating.

The tests or experiments I have already made with my new bearings show that it is at least fifty per cent. more durable than brass bearings. One bearing, after running some seventeen thousand miles, on a heavy locomotive, showed a wear of less than one-sixteenth of an inch, while an ordinary brass bearing, under like circumstances, would have worn away one-eighth inch or more.

In preparing my new metallic compound or alloy, I first melt the zinc, next the tin, and then the lead, mix these three together and stir well, then pulverize the antimony and add it, and mix and stir altogether thoroughly. I then skim off the dross that will form on the surface of the molten compound, and finally add the phosphorus, when I again mix and stir the whole thoroughly, after which it is ready to be poured into suitable molds to form the bearings. The phosphorus causes the other metals to fuse more perfectly, and form a more perfect and homogeneous alloy.

The addition of the phosphorus improves the compound; but my invention is not limited to its use or presence.

In the accompanying drawing, which forms a part of this specification, I have shown, as illustrative of my invention, a journal-bearing for a car or locomotive axle. It will be observed that the bearing is cast in one solid piece, just as a brass bearing.

I am aware that heretofore alloys have been made composed of lead, tin, antimony, and zinc, as shown, for example, in the patent to G. S. Cox, No. 6,757, of October 2, 1849; and I do not herein claim, broadly, any and all compounds of tin, antimony, and zinc, but only the new alloy thereof which I have discovered, composed of such parts in the proportions substantially as hereinbefore stated, and possessing the qualities and distinguishing characteristics hereinbefore pointed out.

The journal-bearings of my new compound may be made in any of the customary forms in use with brass bearings.

I claim—

1. The new metallic compound, consisting of lead, tin, zinc, antimony, and phosphorus, in the proportions substantially as set forth.

2. The journal-bearing cast in one solid piece, like a brass bearing, and composed of lead, tin, zinc, and antimony, in the proportions substantially as described.

3. The new metallic compound, consisting of lead, tin, zinc, and antimony, in the proportions substantially as set forth, and possessing the qualities or distinguishing characteristics substantially as specified.

ARTHELOW M. RANDOLPH.

In presence of—
A. W. FRATER,
S. F. ALDERMAN.